(12) United States Patent
Naruse et al.

(10) Patent No.: US 11,180,163 B2
(45) Date of Patent: Nov. 23, 2021

(54) VEHICLE CONTROL SYSTEM

(71) Applicant: HONDA MOTOR CO., LTD., Tokyo (JP)

(72) Inventors: Tadashi Naruse, Wako (JP); Kanta Tsuji, Wako (JP); Ryoma Taguchi, Tokyo (JP); Yuta Takada, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 21 days.

(21) Appl. No.: 16/832,806

(22) Filed: Mar. 27, 2020

(65) Prior Publication Data

US 2020/0307633 A1    Oct. 1, 2020

(30) Foreign Application Priority Data

Mar. 29, 2019  (JP) .............................. JP2019-066153

(51) Int. Cl.
*B60W 60/00* (2020.01)
*B60W 10/20* (2006.01)
(Continued)

(52) U.S. Cl.
CPC ........ *B60W 60/0016* (2020.02); *B60W 10/20* (2013.01); *B60W 30/181* (2013.01);
(Continued)

(58) Field of Classification Search
CPC ......... B60W 60/0016; B60W 60/0059; B60W 10/20; B60W 30/181; B60W 40/08; B60W 2540/01; B60W 2556/40; B60W 2554/802; B60W 2040/0818; B60W 2540/26; B60W 60/0055; B60W 30/182; B60W 2050/007; B60W 50/02; B60W 50/029; G05D 1/0061
See application file for complete search history.

(56) References Cited

U.S. PATENT DOCUMENTS 10,336,344 B2   7/2019 Otake
2011/0093168 A1*  4/2011 Barth ................... G08G 1/16
                                                701/41

(Continued)

FOREIGN PATENT DOCUMENTS

JP    2017144808 A    8/2017
JP    2018024290 A    2/2018
(Continued)

*Primary Examiner* — Adam R Mott
*Assistant Examiner* — Frank T Glenn, III
(74) *Attorney, Agent, or Firm* — Armstrong Teasdale LLP (57) ABSTRACT

In a vehicle control system (1, 101), a control unit is configured to execute a stop process by which the vehicle is parked in a prescribed stop area when it is detected that the control unit or the driver has become incapable of properly maintaining a traveling state of the vehicle, and, in the stop process, the control unit extracts a plurality of available stop areas according to information from at least one of an external environment recognition device and a map device, and selects a stop area from the available stop areas (A, B) by taking into account a possibility of the driver resuming driving the vehicle after the stop process has been initiated according to a result of monitoring the driver by an occupant monitoring device.

6 Claims, 6 Drawing Sheets

(51) Int. Cl.
*B60W 30/18* (2012.01)
*B60W 40/08* (2012.01)

(52) U.S. Cl.
CPC ........ *B60W 40/08* (2013.01); *B60W 60/0059* (2020.02); *B60W 2040/0818* (2013.01); *B60W 2540/01* (2020.02); *B60W 2540/26* (2013.01); *B60W 2554/802* (2020.02); *B60W 2556/40* (2020.02)

(56) References Cited

U.S. PATENT DOCUMENTS

| | | | |
|---|---|---|---|
| 2017/0090480 A1* | 3/2017 | Ho | G05D 1/0027 |
| 2017/0327111 A1* | 11/2017 | Bonarens | B60W 30/08 |
| 2018/0037226 A1 | 2/2018 | Otake et al. | |
| 2018/0229726 A1 | 8/2018 | Ikeda et al. | |
| 2019/0039617 A1* | 2/2019 | Miura | B60W 30/09 |
| 2020/0082185 A1* | 3/2020 | Yamamoto | B60R 1/002 |
| 2020/0133259 A1* | 4/2020 | Van Wiemeersch | H04W 4/40 |

FOREIGN PATENT DOCUMENTS

| | | |
|---|---|---|
| JP | 2018027723 A | 2/2018 |
| JP | 2018131081 A | 8/2018 |

\* cited by examiner

VEHICLE CONTROL SYSTEM

TECHNICAL FIELD

The present invention relates to a vehicle control system configured for autonomous driving.

BACKGROUND ART

According to a known vehicle control system, when the driver has become unable to properly drive the vehicle, the vehicle is caused to automatically travel to a safe area, and park in the safe area. See JP2018-131081A, JP2018-27723A, JP2018-24290A, and JP2017-144808A, for instance. When the vehicle control system disclosed in JP2018-131081A determines that the driver is in an abnormal state, and is unable to drive the vehicle properly, the vehicle control system can specify a stop area such as a roadside zone or a parking lot, and can safely evacuate the vehicle to the stop area.

According to the vehicle control system disclosed in JP2018-27723A, when the brake pedal is depressed during the process of evacuating the vehicle to a stop area, the vehicle control system limits the deceleration level or the time change of the deceleration so that the vehicle traveling behind this vehicle is prevented from braking suddenly.

According to the vehicle control system disclosed in JP2018-24290A, when the own vehicle is following the preceding vehicle under an adaptive cruise control, and the driver is determined to be in an abnormal condition, the vehicle control system continues the adaptive cruise control for a prescribed time period. Therefore, even when the vehicle control system should erroneously determine that the driver is in an abnormal condition, the vehicle is allowed to continue traveling.

According to the vehicle control system disclosed in JP2017-1448086 A, during an evacuation process, the vehicle control system disables an input to a driving operation element such as an accelerator pedal. Thereafter, if a prescribed input is made to the driving operation element, the input to the driving operation element is revived so that the driving operation element is made to accept an input thereto once again.

If the driver is in a serious condition that requires an immediate rescue operation, the vehicle should be stopped as soon as possible. However, the driver may become able to resume driving after the vehicle has come to a stop although the drive has become temporarily unable to drive the vehicle. In such a situation, it is preferable to stop the vehicle at a position from which the vehicle can start traveling with ease. However, according to the conventional vehicle control systems mentioned above, in an emergency situation, the selection of the stop area for an emergency stop takes no account of the possibility of the driver resuming driving. Therefore, according to the prior art, in an emergency situation, the vehicle may be brought to a stop at a place that may not suit the condition of the driver.

SUMMARY OF THE INVENTION

In view of such a problem of the prior art, a primary object of the present invention is to provide a vehicle control system configured for autonomous driving that stops the vehicle at a position that suits the driver's condition in an emergency situation.

To achieve such an object, the present invention provides a vehicle control system (1, 101), comprising: a control unit (15) for steering, accelerating, and decelerating a vehicle; an occupant monitoring device (11) configured to monitor a driver of the vehicle; and at least one of an external environment recognition device (6) configured to acquire information on an environment surrounding the vehicle, and a map device (9) retaining map information; wherein the control unit is configured to execute a stop process by which the vehicle is parked in a prescribed stop area when it is detected that the control unit or the driver has become incapable of properly maintaining a traveling state of the vehicle, and wherein, in the stop process, the control unit extracts a plurality of available stop areas according to information from at least one of the external environment recognition device and the map device, and selects a stop area from the available stop areas (A, B) by taking into account a possibility of the driver resuming driving the vehicle after the stop process has been initiated according to a result of monitoring the driver by the occupant monitoring device.

Thereby, the stop area is selected from the available stop areas based on the possibility that the driver will resume driving after the stop process is initiated. Thus, the vehicle can be stopped at an appropriate position depending on the situation of the driver.

Preferably, the control unit is configured to compute a driving resuming ratio indicating a possibility of the driver resuming driving the vehicle after the stop process has been initiated according to the result of monitoring the driver by the occupant monitoring device, and to determine the stop area by comparing the driving resuming ratio with a prescribed driving resuming ratio threshold.

According to this configuration, the possibility of resuming the driving of the vehicle by the current driver can be easily determined by comparing the driving resuming ratio of the driver with the driving resuming ratio threshold. This simplifies the process of determining the stop area according to the driver's situation.

Preferably, in the stop process, the control unit is configured to determine the stop area from the available stop areas which is closer to a current position of the vehicle than at least one other available stop area when the driving resuming ratio is smaller than the driving resuming ratio threshold.

Thus, when the driving resuming ratio is lower than the driving resuming ratio threshold, and the driver needs rescue, the vehicle can be stopped with a minimum delay so that the rescue of the driver can be started at an early time point.

Preferably, the map device retains a planned travel route of the vehicle, and, in the stop process, when the driving resuming ratio is equal to or greater than the driving resuming ratio threshold, the control unit determines the available stop area involving a lower risk than at least one other available stop area as the stop area by computing a risk involved in traveling to each available stop area and coming to a stop at the stop area according to at least one of the information acquired by the external environment recognition device and the map information retained by the map device.

Thus, when the driving resuming ratio is equal to or greater than the driving resuming ratio threshold, an available stop area involving a small risk of in traveling thereto and stopping therein is selected as the stop area, and the vehicle is brought to a stop in the stop area so that the vehicle can be stopped at a position which the vehicle can reach with a smallest possible risk.

Preferably, the map device retains a planned travel route of the vehicle, and the occupant monitoring device is configured to monitor an occupant other than the driver. And, in the stop process, when the driving resuming ratio is equal to or greater than the driving resuming ratio threshold, the control unit determines if it is detected that an occupant capable of taking over driving is onboard according to a signal from the occupant monitoring device, the control unit determining the available stop area closer to the vehicle than at least one other available stop area as the stop area when it is detected that an occupant capable of taking over driving is onboard, and determining the available stop area involving a lower risk than at least one other available stop area as the stop area when it is detected that an occupant capable of taking over driving is not onboard by computing a risk involved in traveling to each available stop area and coming to a stop at the stop area according to at least one of the information acquired by the external environment recognition device and the map information retained by the map device.

Thereby, when the driving resuming ratio is high and there is no occupant onboard who can take over the driving, the available stop area with a smallest risk in reaching is selected as the stop area, and the vehicle is brought to a stop in this stop area. Thus, the vehicle is stopped at a position which involves the smallest possible risk. On the other hand, when the driving resuming ratio is high and an occupant who can take over the driving is onboard the vehicle, the vehicle is brought to a stop in the nearest available stop area. This allows the occupant other than the driver to take over the driving with a minimum delay.

Preferably, the vehicle control system further comprises a driving operation device that receives an input operation performed by the driver to control the vehicle, wherein, in the stop process, and the control unit prohibits the input operation to the driving operation device to control the vehicle until the vehicle comes to stop when the driving resuming ratio is smaller than the driving resuming ratio threshold, and prohibits the input operation to the driving operation device to control the vehicle until an amount of the input operation to the driving operation device to the control the vehicle has become equal to or greater than a prescribed operation amount threshold.

Thus, when the driving resuming ratio is equal to or greater than the driving resuming ratio threshold, the driver can regain the control of the vehicle simply by performing an input operation to the driving operation device in an amount equal to or greater than the operation amount threshold. Thus, when the driver has regained the capability to resume driving, the driving operation can be started with a minimum delay. When the driving resuming ratio is less than the driving resuming ratio threshold, the control of the vehicle based on an input operation to the driving operation device is prohibited. Thereby, when the driver is not capable of resuming driving, even if the driver unintentionally should perform an input operation to the driving operation device, the input operation is disregarded, and the vehicle behavior is kept unchanged so that the vehicle can be brought to a stop in a safe manner.

Preferably, in executing the stop process, once the stop area is determined, the control unit notifies position information of the stop area to an external station or an external device before the vehicle reaches the stop area.

Thus, after the stop area is determined, the position information of the stop area is notified to the outside before the vehicle reaches the stop area so that the situation of the vehicle can be notified to the outside with a minimum delay.

Thereby, a rescue operation such as a dispatch of an emergency vehicle can be performed promptly so that the driver's rescue can be started earlier.

The present invention thus provides a vehicle control system configured for autonomous driving that stops the vehicle at a position that suits the driver's condition in an emergency situation.

DESCRIPTION OF THE PREFERRED EMBODIMENT(S)

A vehicle control system according to a preferred embodiment of the present invention is described in the following with reference to the appended drawings. The following disclosure is based on left-hand traffic. In the case of right-hand traffic, the left and the right in the disclosure will be reversed.

First Embodiment

Figure 1:
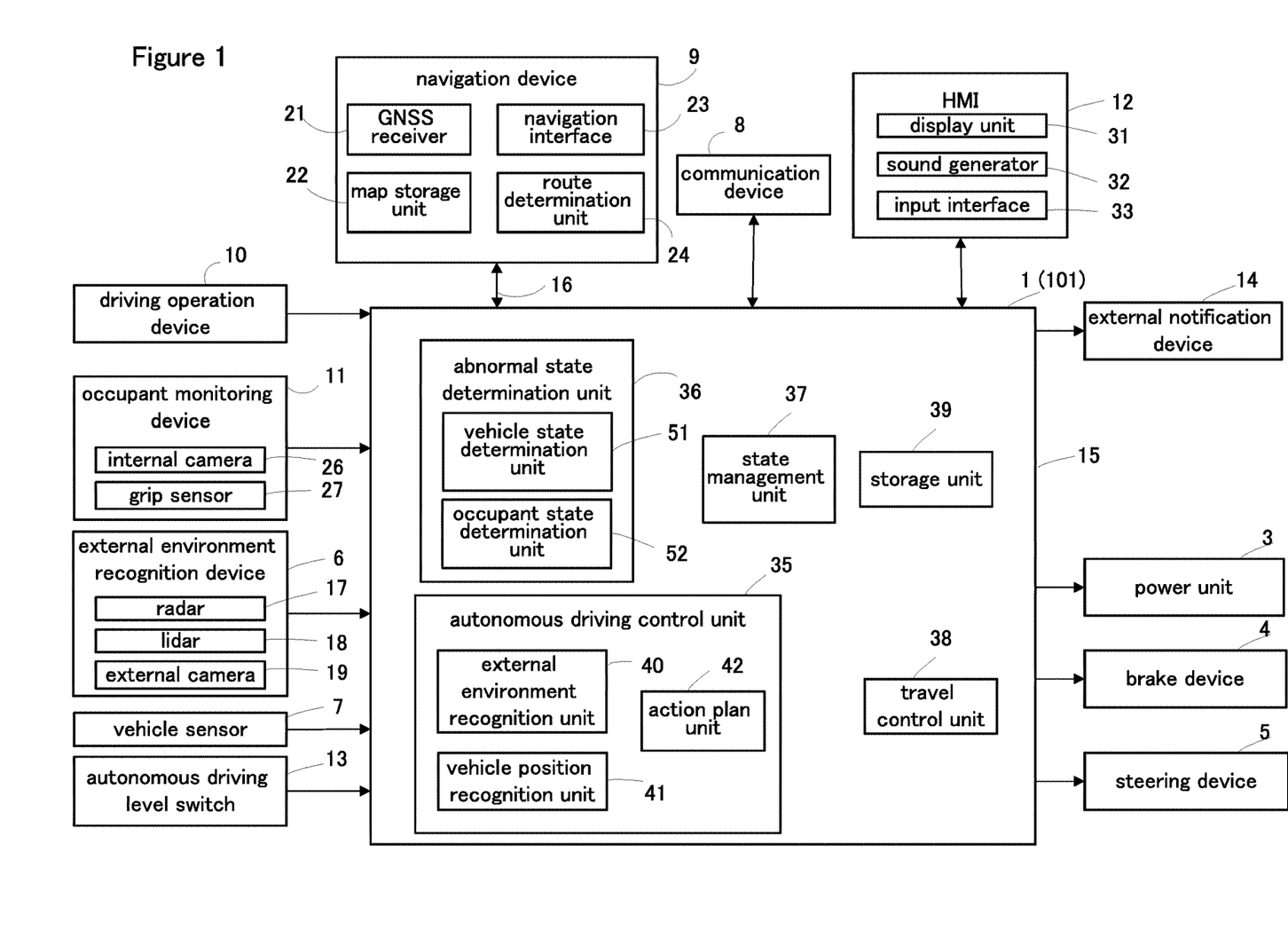
FIG. 1 is a functional block diagram of a vehicle on which a vehicle control system according to a first embodiment of the present invention is mounted.

As shown in FIG. 1, the vehicle control system 1 according to the present invention is a part of a vehicle system 2 mounted on a vehicle. The vehicle system 2 includes a power unit 3, a brake device 4, a steering device 5, an external environment recognition device 6, a vehicle sensor 7, a communication device 8, a navigation device 9 (map device), a driving operation device 10, an occupant monitoring device 11, an HMI 12 (Human Machine Interface), an autonomous driving level switch 13, an external notification device 14, and a control unit 15. These components of the vehicle system 2 are connected to one another so that signals can be transmitted between them via a communication means such as CAN 16 (Controller Area Network).

The power unit 3 is a device for applying a driving force to the vehicle, and may include a power source and a transmission unit. The power source may consist of an internal combustion engine such as a gasoline engine and a diesel engine, an electric motor or a combination of these. The brake device 4 is a device that applies a braking force to the vehicle, and may include a brake caliper that presses a brake pad against a brake rotor, and an electrically actuated hydraulic cylinder that supplies hydraulic pressure to the brake caliper. The brake device 4 may also include a parking brake device. The steering device 5 is a device for changing a steering angle of the wheels, and may include a rack-and-pinion mechanism that steers the front wheels, and an electric motor that drives the rack-and-pinion mechanism. The power unit 3, the brake device 4, and the steering device 5 are controlled by the control unit 15.

The external environment recognition device 6 is a device that detects objects located outside of the vehicle. The external environment recognition device 6 may include a sensor that captures electromagnetic waves or light from around the vehicle to detect objects outside of the vehicle, and may consist of a radar 17, a lidar 18, an external camera 19, or a combination of these. The external environment recognition device 6 may also be configured to detect objects outside of the vehicle by receiving a signal from a source outside of the vehicle. The detection result of the external environment recognition device 6 is forwarded to the control unit 15.

The radar 17 emits radio waves such as millimeter waves to the surrounding area of the vehicle, and detects the position (distance and direction) of an object by capturing the reflected wave. Preferably, the radar 17 includes a front radar that radiates radio waves toward the front of the vehicle, a rear radar that radiates radio waves toward the rear of the vehicle, and a pair of side radars that radiates radio waves in the lateral directions.

The lidar 18 emits light such as an infrared ray to the surrounding part of the vehicle, and detects the position (distance and direction) of an object by capturing the reflected light. At least one lidar 18 is provided at a suitable position of the vehicle.

The external camera 19 can capture the image of the surrounding objects such as vehicles, pedestrians, guardrails, curbs, walls, median strips, road shapes, road signs, road markings painted on the road, and the like. The external camera 19 may consist of a digital camera using a solid-state imaging device such as a CCD and a CMOS. At least one external camera 19 is provided at a suitable position of the vehicle. The external camera 19 preferably includes a front camera that images the front of the vehicle, a rear camera that images the rear of the vehicle and a pair of side cameras that image the lateral views from the vehicle. The external camera 19 may consist of a stereo camera that can capture a three-dimensional image of the surrounding objects.

The vehicle sensor 7 may include a vehicle speed sensor that detects the traveling speed of the vehicle, an acceleration sensor that detects the acceleration of the vehicle, a yaw rate sensor that detects an angular velocity of the vehicle around a vertical axis, a direction sensor that detects the traveling direction of the vehicle, and the like. The yaw rate sensor may consist of a gyro sensor.

The communication device 8 allows communication between the control unit 15 which is connected to the navigation device 9 and other vehicles around the own vehicle as well as servers located outside the vehicle. The control unit 15 can perform wireless communication with the surrounding vehicles via the communication device 8. For instance, the control unit 15 can communicate with a server that provides traffic regulation information via the communication device 8, and with an emergency call center that accepts an emergency call from the vehicle also via the communication device 8. Further, the control unit 15 can communicate with a portable terminal carried by a person such as a pedestrian present outside the vehicle via the communication device 8.

The navigation device 9 is able to identify the current position of the vehicle, and performs route guidance to a destination and the like, and may include a GNSS receiver 21, a map storage unit 22, a navigation interface 23, and a route determination unit 24. The GNSS receiver 21 identifies the position (latitude and longitude) of the vehicle according to a signal received from artificial satellites (positioning satellites). The map storage unit 22 may consist of a per se known storage device such as a flash memory and a hard disk, and stores or retains map information. The navigation interface 23 receives an input of a destination or the like from the user, and provides various information to the user by visual display and/or speech. The navigation interface 23 may include a touch panel display, a speaker, and the like. In another embodiment, the GNSS receiver 21 is configured as a part of the communication device 8. The map storage unit 22 may be configured as a part of the control unit 15 or may be configured as a part of an external server that can communicate with the control unit 15 via the communication device 8.

The map information may include a wide range of road information which may include, not exclusively, road types such as expressways, toll roads, national roads, and prefectural roads, the number of lanes of the road, road markings such as the center position of each lane (three-dimensional coordinates including longitude, latitude, and height), road division lines and lane lines, the presence or absence of sidewalks, curbs, fences, etc., the locations of intersections, the locations of merging and branching points of lanes, the areas of emergency parking zones, the width of each lane, and traffic signs provided along the roads. The map information may also include traffic regulation information, address information (address/postal code), facility information, telephone number information, and the like.

The route determination unit 24 determines a route to the destination based on the position of the vehicle specified by the GNSS receiver 21, the destination input from the navigation interface 23, and the map information. When determining the route, in addition to the route, the route determination unit 24 determines the target lane which the vehicle will travel in by referring to the merging and branching points of the lanes in the map information.

The driving operation device 10 receives an input operation performed by the driver to control the vehicle. The driving operation device 10 may include a steering wheel, an accelerator pedal, and a brake pedal. Further, the driving operation device 10 may include a shift lever, a parking brake lever, and the like. Each element of the driving operation device 10 is provided with a sensor for detecting an operation amount of the corresponding operation. The driving operation device 10 outputs a signal indicating the operation amount to the control unit 15.

The occupant monitoring device 11 monitors the state of the occupant in the passenger compartment. The occupant monitoring device 11 includes, for example, an internal camera 26 that images an occupant sitting on a seat in the vehicle cabin, and a grip sensor 27 provided on the steering wheel. The internal camera 26 is a digital camera using a solid-state imaging device such as a CCD and a CMOS. The grip sensor 27 is a sensor that detects if the driver is gripping the steering wheel, and outputs the presence or absence of the grip as a detection signal. The grip sensor 27 may be formed of a capacitance sensor or a piezoelectric device provided on the steering wheel. The occupant monitoring device 11 may include a heart rate sensor provided on the steering wheel or the seat, or a seating sensor provided on the seat. In addition, the occupant monitoring device 11 may be a wearable device that is worn by the occupant, and can detect the vital information of the driver including at least one of the heart rate and the blood pressure of the driver. In this conjunction, the occupant monitoring device 11 may be configured to be able to communicate with the control unit 15 via a per se known wireless communication means. The occupant monitoring device 11 outputs the captured image and the detection signal to the control unit 15.

The external notification device 14 is a device for notifying to people outside of the vehicle by sound and/or light, and may include a warning light and a horn. A headlight (front light), a taillight, a brake lamp, a hazard lamp, and a vehicle interior light may function as a warning light.

The HMI 12 notifies the occupant of various kinds of information by visual display and speech, and receives an input operation by the occupant. The HMI 12 may include at least one of a display device 31 such as a touch panel and an indicator light including an LCD or an organic EL, a sound generator 32 such as a buzzer and a speaker, and an input interface 33 such as a GUI switch on the touch panel and a mechanical switch. The navigation interface 23 may be configured to function as the HMI 12.

The autonomous driving level switch 13 is a switch that activates autonomous driving as an instruction from the driver. The autonomous driving level switch 13 may be a mechanical switch or a GUI switch displayed on the touch panel, and is positioned in a suitable part of the cabin. The autonomous driving level switch 13 may be formed by the input interface 33 of the HMI 12 or may be formed by the navigation interface 23.

The control unit 15 may consist of an electronic control unit (ECU) including a CPU, a ROM, a RAM, and the like. The control unit 15 executes various types of vehicle control by executing arithmetic processes according to a computer program executed by the CPU. The control unit 15 may be configured as a single piece of hardware, or may be configured as a unit including a plurality of pieces of hardware. In addition, at least a part of each functional unit of the control unit 15 may be realized by hardware such as an LSI, an ASIC, and an FPGA, or may be realized by a combination of software and hardware.

The control unit 15 is configured to execute autonomous driving control of at least level 0 to level 3 by combining various types of vehicle control. The level is based on the definition of SAE J3016, and is determined in relation to the degree of machine intervention in the driving operation of the driver and in the monitoring of the surrounding environment of the vehicle.

In autonomous driving of level 0, the control unit 15 does not control the vehicle, and the driver performs all of the driving operations. Thus, autonomous driving of level 0 means a manual driving.

In autonomous driving of level 1, the control unit 15 executes a certain part of the driving operation, and the driver performs the remaining part of the driving operation. For example, autonomous driving level 1 includes constant speed traveling, inter-vehicle distance control (ACC; Adaptive Cruise Control) and lane keeping assist control (LKAS; Lane Keeping Assistance System). The level 1 autonomous driving is executed when various devices (for example, the external environment recognition device 6 and the vehicle sensor 7) required for executing the level 1 autonomous driving are all properly functioning.

In autonomous driving of level 2, the control unit 15 performs the entire driving operation. The level 2 autonomous driving is performed only when the driver monitors the surrounding environment of the vehicle, the vehicle is within a designated area, and the various devices required for performing the level 2 autonomous driving are all functioning properly.

In level 3 autonomous driving, the control unit 15 performs the entire driving operation. The level 3 autonomous driving requires the driver to monitor or be aware of the surrounding environment when required, and is executed only when the vehicle is within a designated area, and the various devices required for performing the level 3 autonomous driving are all functioning properly. The conditions under which the level 3 autonomous driving is executed may include that the vehicle is traveling on a congested road. Whether the vehicle is traveling on a congested road or not may be determined based on traffic regulation information provided from a server outside of the vehicle, or, alternatively, that the vehicle speed detected by the vehicle speed sensor is determined to be lower than a predetermined slowdown determination value (for example, 30 km/h) over a predetermined time period.

Thus, in the autonomous driving of levels 1 to 3, the control unit 15 executes at least one of the steering, the acceleration, the deceleration, and the monitoring of the surrounding environment. When in the autonomous driving mode, the control unit 15 executes the autonomous driving of level 1 to level 3. Hereinafter, the steering, acceleration, and deceleration operations are collectively referred to as driving operation, and the driving and the monitoring of the surrounding environment may be collectively referred to as driving.

In the present embodiment, when the control unit 15 has received an instruction to execute autonomous driving via the autonomous driving level switch 13, the control unit 15 selects the autonomous driving level that is suitable for the environment of the vehicle according to the detection result of the external environment recognition device 6 and the position of the vehicle acquired by the navigation device 9, and changes the autonomous driving level as required. However, the control unit 15 may also change the autonomous driving level according the input to the autonomous driving level switch 13.

As shown in FIG. 1, the control unit 15 includes an autonomous driving control unit 35, an abnormal state determination unit 36, a state management unit 37, a travel control unit 38, and a storage unit 39.

The autonomous driving control unit 35 includes an external environment recognition unit 40, a vehicle position recognition unit 41, and an action plan unit 42. The external environment recognition unit 40 recognizes an obstacle located around the vehicle, the shape of the road, the presence or absence of a sidewalk, and road signs based on the detection result of the external environment recognition device 6. The obstacles include, not exclusively, guardrails, telephone poles, surrounding vehicles, and pedestrians. The external environment recognition unit 40 can acquire the state of the surrounding vehicles, such as the position, speed, and acceleration of each surrounding vehicle from the detection result of the external environment recognition device 6. The position of each surrounding vehicle may be recognized as a representative point such as a center of gravity position or a corner positions of the surrounding vehicle, or an area represented by the contour of the surrounding vehicle.

The vehicle position recognition unit 41 recognizes a traveling lane, which is a lane in which the vehicle is traveling, and a relative position and an angle of the vehicle with respect to the traveling lane. The vehicle position recognition unit 41 may recognize the traveling lane based on the map information stored in the map storage unit 22 and the position of the vehicle acquired by the GNSS receiver 21. In addition, the lane markings drawn on the road surface around the vehicle may be extracted from the map information, and the relative position and angle of the vehicle with respect to the traveling lane may be recognized by comparing the extracted lane markings with the lane markings captured by the external camera 19.

The action plan unit 42 sequentially creates an action plan for driving the vehicle along the route. More specifically, the action plan unit 42 first determines a set of events for traveling on the target lane determined by the route determination unit 24 without the vehicle coming into contact with an obstacle. The events may include a constant speed traveling event in which the vehicle travels in the same lane at a constant speed, a preceding vehicle following event in which the vehicle follows a preceding vehicle at a certain speed which is equal to or lower than a speed selected by the driver or a speed which is determined by the prevailing environment, a lane changing event in which the vehicle change lanes, a passing event in which the vehicle passes a preceding vehicle, a merging event in which the vehicle merge into the traffic from another road at a junction of the road, a diverging event in which the vehicle travels into a selected road at a junction of the road, an autonomous driving end event in which autonomous driving is ended, and the driver takes over the driving operation, and a stop event in which the vehicle is brought to a stop when a certain condition is met, the condition including a case where the control unit 15 or the driver has become incapable of continuing the driving operation.

The conditions under which the action plan unit 42 invokes the stop event include the case where an input to the internal camera 26, the grip sensor 27, or the autonomous driving level switch 13 in response to an intervention request (a hand-over request) to the driver is not detected during autonomous driving. The intervention request is a warning to the driver to take over a part of the driving, and to perform at least one of the driving operation and the monitoring of the environment corresponding to the part of the driving that is to be handed over. The condition under which the action plan unit 42 invokes the stop even include the case where the action plan unit 42 has detected that the driver has become incapable of performing the driving while the vehicle is traveling due to a physiological ailment according to the signal from a pulse sensor, the internal camera or the like.

During the execution of these events, the action plan unit 42 may invoke an avoidance event for avoiding an obstacle or the like based on the surrounding conditions of the vehicle (existence of nearby vehicles and pedestrians, lane narrowing due to road construction, etc.).

The action plan unit 42 generates a target trajectory for the vehicle to travel in the future corresponding to the selected event. The target trajectory is obtained by sequentially arranging trajectory points that the vehicle should trace at each time point. The action plan unit 42 may generate the target trajectory based on the target speed and the target acceleration set for each event. At this time, the information on the target speed and the target acceleration is determined for each interval between the trajectory points.

The travel control unit 38 controls the power unit 3, the brake device 4, and the steering device 5 so that the vehicle traces the target trajectory generated by the action plan unit 42 according to the schedule also generated by the action plan unit 42.

The storage unit 39 is formed by a ROM, a RAM, or the like, and stores information required for the processing by the autonomous driving control unit 35, the abnormal state determination unit 36, the state management unit 37, and the travel control unit 38.

The abnormal state determination unit 36 includes a vehicle state determination unit 51 and an occupant state determination unit 52. The vehicle state determination unit 51 analyzes signals from various devices (for example, the external environment recognition device 6 and the vehicle sensor 7) that affect the level of the autonomous driving that is being executed, and detects the occurrence of an abnormality in any of the devices and units that may prevent a proper execution of the autonomous driving of the level that is being executed.

The occupant state determination unit 52 determines if the driver is in an abnormal state or not according to a signal from the occupant monitoring device 11. The abnormal state includes the case where the driver is unable to properly steer the vehicle in autonomous driving of level 1 or lower that requires the driver to steer the vehicle. That the driver is unable to steer the vehicle in autonomous driving of level 1 or lower could mean that the driver is not holding the steering wheel, the driver is asleep, the driver is incapacitated or unconscious due to illness or injury, or the driver is under a cardiac arrest. The occupant state determination unit 52 determines that the driver is in an abnormal state when there is no input to the grip sensor 27 from the driver while in autonomous driving of level 1 or lower that requires the driver to steer the vehicle. Further, the occupant state determination unit 52 may determine the open/closed state of the driver's eyelids from the face image of the driver that is extracted from the output of the internal camera 26. The occupant state determination unit 52 may determine that the driver is asleep, under a strong drowsiness, unconscious or under a cardiac arrest so that the drive is unable to properly drive the vehicle, and the driver is in an abnormal condition when the driver's eyelids are closed for more than a predetermined time period, or when the number of times the eyelids are closed per unit time interval is equal to or greater than a predetermined threshold value. The occupant state determination unit 52 may further acquire the driver's posture from the captured image to determine that the driver's posture is not suitable for the driving operation or that the posture of the driver does not change for a predetermined time period. It may well mean that the driver is incapacitated due to illness or injury, and in an abnormal condition.

In the case of autonomous driving of level 2 or lower, the abnormal condition includes a situation where the driver is neglecting the duty to monitor the environment surrounding the vehicle. This situation may include either the case where the driver is not holding or gripping the steering wheel or the case where the driver's line of sight is not directed in the forward direction. The occupant state determination unit 52 may detect the abnormal condition where the driver is neglecting to monitor the environment surrounding the vehicle when the output signal of the grip sensor 27 indicates that the driver is not holding the steering wheel. The occupant state determination unit 52 may detect the abnormal condition according to the image captured by the internal camera 26. The occupant state determination unit 52 may use a per se known image analysis technique to extract the face region of the driver from the captured image, and then extracts the iris parts (hereinafter, iris) including the inner and outer corners of the eyes and pupils from the extracted face area. The occupant state determination unit 52 may detect the driver's line of sight according to the positions of the inner and outer corners of the eyes, the iris, the outline of the iris, and the like. It is determined that the driver is neglecting the duty to monitor the environment surrounding the vehicle when the driver's line of sight is not directed in the forward direction.

In addition, in the autonomous driving at a level where the drive is not required to monitor the surrounding environment or in the autonomous driving of level 3, an abnormal condition refers to a state in which the driver cannot promptly take over the driving when a driving takeover request is issued to the driver. The state where the driver cannot take over the driving includes the state where the system cannot be monitored, or, in other words, where the driver cannot monitor a screen display that may be showing an alarm display such as when the driver is asleep, and when the driver is not looking ahead. In the present embodiment, in the level 3 autonomous driving, the abnormal condition includes a case where the driver cannot perform the duty of monitoring the surrounding environment of the vehicle even though the driver is notified to monitor the surrounding environment of the vehicle. In the present embodiment, the occupant state determination unit 52 displays a predetermined screen on the display device 31 of the HMI 12, and instructs the driver to look at the display device 31. Thereafter, the occupant state determination unit 52 detects the driver's line of sight with the internal camera 26, and determines that the driver is unable to fulfill the duty of monitoring the surrounding environment of the vehicle if driver's line of sight is not facing the display device 31 of the HMI 12.

The occupant state determination unit 52 may detect if the driver is gripping the steering wheel according to the signal from the grip sensor 27, and if the driver is not gripping the steering wheel, it can be determined that the vehicle is in an abnormal state in which the duty of monitoring the surrounding environment the vehicle is being neglected. Further, the occupant state determination unit 52 determines if the driver is in an abnormal state according to the image captured by the internal camera 26. For example, the occupant state determination unit 52 extracts a driver's face region from the captured image by using a per se known image analysis means. The occupant state determination unit 52 may further extract iris parts (hereinafter, iris) of the driver including the inner and outer corners of the eyes and pupils from the extracted face area. The occupant state determination unit 52 obtains the driver's line of sight according to the extracted positions of the inner and outer corners of the eyes, the iris, the outline of the iris, and the like. It is determined that the driver is neglecting the duty to monitor the environment surrounding the vehicle when the driver's line of sight is not directed in the forward direction.

The state management unit 37 selects the level of the autonomous driving according to at least one of the own vehicle position, the operation of the autonomous driving level switch 13, and the determination result of the abnormal state determination unit 36. Further, the state management unit 37 controls the action plan unit 42 according to the selected autonomous driving level, thereby performing the autonomous driving according to the selected autonomous driving level. For example, when the state management unit 37 has selected the level 1 autonomous driving, and a constant speed traveling control is being executed, the event to be determined by the action plan unit 42 is limited only to the constant speed traveling event.

The state management unit 37 raises and lowers the autonomous driving level as required in addition to executing the autonomous driving according to the selected level.

More specifically, the state management unit 37 raises the level when the condition for executing the autonomous driving at the selected level is met, and an instruction to raise the level of the autonomous driving is input to the autonomous driving level switch 13.

When the condition for executing the autonomous driving of the current level ceases to be satisfied, or when an instruction to lower the level of the autonomous driving is input to the autonomous driving level switch 13, the state management unit 37 executes an intervention request process. In the intervention request process, the state management unit 37 first notifies the driver of a handover request. The notification to the driver may be made by displaying a message or image on the display device 31 or generating a speech or a warning sound from the sound generator 32. The notification to the driver may continue for a predetermined period of time after the intervention request process is started or may be continued until an input is detected by the occupant monitoring device 11.

The condition for executing the autonomous driving of the current level ceases to be satisfied when the vehicle has moved to an area where only the autonomous driving of a level lower than the current level is permitted, or when the abnormal state determination unit 36 has determined that an abnormal condition that prevents the continuation of the autonomous driving of the current level has occurred to the driver or the vehicle.

Following the notification to the driver, the state management unit 37 detects if the internal camera 26 or the grip sensor 27 has received an input from the driver indicating a takeover of the driving. The detection of the presence or absence of an input to take over the driving is determined in a way that depends on the level that is to be selected. When moving to level 2, the state management unit 37 extracts the driver's line of sight from the image acquired by the internal camera 26, and when the driver's line of sight is facing the front of the vehicle, it is determined that an input indicating the takeover of the driving by the driver is received. When moving to level 1 or level 0, the state management unit 37 determines that there is an input indicating an intent to take over the driving when the grip sensor 27 has detected the gripping of the steering wheel by the driver. Thus, the internal camera 26 and the grip sensor 27 function as an intervention detection device that detects an intervention of the driver to the driving. Further, the state management unit 37 may detect if there is an input indicating an intervention of the driver to the driving according to the input to the autonomous driving level switch 13.

The state management unit 37 lowers the autonomous driving level when an input indicating an intervention to the driving is detected within a predetermined period of time from the start of the intervention request process. At this time, the level of the autonomous driving after the lowering of the level may be level 0, or may be the highest level that can be executed.

The state management unit 37 causes the action plan unit 42 to generate a stop event when an input corresponding to the driver's intervention to the driving is not detected within a predetermined period of time after the execution of the intervention request process. The stop event is an event in which the vehicle is brought to a stop at a safe position (for example, an emergency parking zone, a roadside zone, a roadside shoulder, a parking area, etc.) while the vehicle control is degenerated. Here, a series of procedures executed in the stop event may be referred to as MRM (Minimum Risk Maneuver).

When the stop event is invoked, the control unit 15 shifts from the autonomous driving mode to the automatic stop mode, and the action plan unit 42 executes the stop process. Hereinafter, an outline of the stop process is described with reference to the flowchart of FIG. 2.

Figure 2:
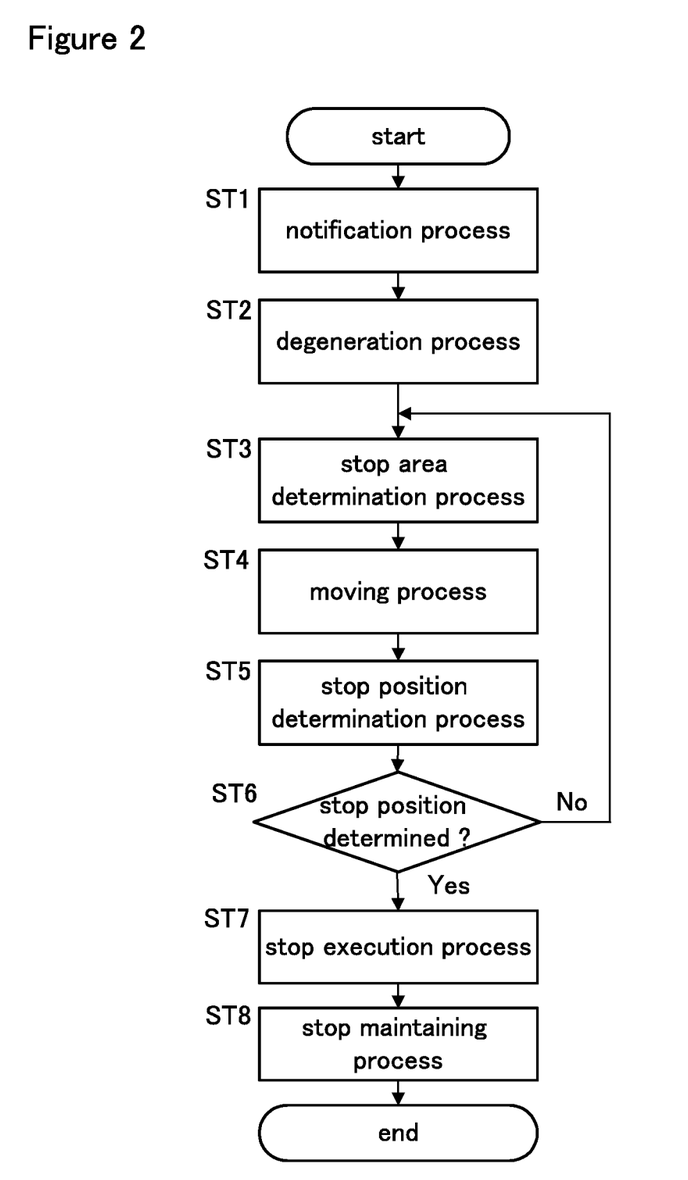
FIG. 2 is a flowchart of a stop process.

In the stop process, a notification process is first executed (ST1). In the notification process, the action plan unit 42 operates the external notification device 14 to notify the people outside of the vehicle. For example, the action plan unit 42 activates a horn included in the external notification device 14 to periodically generate a warning sound. The notification process continues until the stop process ends. After the notification process has ended, the action plan unit 42 may continue to activate the horn to generate a warning sound depending on the situation.

Then, a degeneration process is executed (ST2). The degeneration process is a process of restricting events that can be invoked by the action plan unit 42. The degeneration process may prohibit a lane change event to a passing lane, a passing event, a merging event, and the like. Further, in the degeneration process, the speed upper limit and the acceleration upper limit of the vehicle may be more limited in the respective events as compared with the case where the stop process is not performed.

Next, a stop area determination process is executed (ST3). The stop area determination process refers to the map information based on the current position of the own vehicle, and extracts a plurality of available stop areas (candidates for the stop area or potential stop areas) suitable for stopping, such as road shoulders and evacuation spaces in the traveling direction of the own vehicle. Then, one of the available stop areas is selected as the stop area by taking into account the size of the stop area, the distance to the stop area, and the like.

Next, a moving process is executed (ST4). In the moving process, a route for reaching the stop area is determined, various events along the route leading to the stop area are generated, and a target trajectory is determined. The travel control unit 38 controls the power unit 3, the brake device 4, and the steering device 5 based on the target trajectory determined by the action plan unit 42. The vehicle then travels along the route and reaches the stop area.

Next, a stop position determination process is executed (ST5). In the stop position determination process, the stop position is determined based on obstacles, road markings, and other objects located around the vehicle recognized by the external environment recognition unit 40. In the stop position determination process, it is possible that the stop position cannot be determined in the stop area due to the presence of surrounding vehicles and obstacles. When the stop position cannot be determined in the stop position determination process (No in ST6), the stop area determination process (ST3), the movement process (ST4), and the stop position determination process (ST5) are sequentially repeated.

If the stop position can be determined in the stop position determination process (Yes in ST6), a stop execution process is executed (ST7). In the stop execution process, the action plan unit 42 generates a target trajectory based on the current position of the vehicle and the targeted stop position. The travel control unit 38 controls the power unit 3, the brake device 4, and the steering device 5 based on the target trajectory determined by the action plan unit 42. The vehicle then moves toward the stop position and stops at the stop position.

After the stop execution process is executed, a stop maintaining process is executed (ST8). In the stop maintaining process, the travel control unit 38 drives the parking brake device according to a command from the action plan unit 42 to maintain the vehicle at the stop position. Thereafter, the action plan unit 42 may transmit an emergency call to the emergency call center by the communication device 8. When the stop maintaining process is completed, the stop process ends.

The vehicle control system 1 includes the external environment recognition device 6, the navigation device 9 (map device), the occupant monitoring device 11, and the control unit 15 as mentioned earlier, and is configured to execute the degeneration process and the stop area determination process by taking into account the possibility that the driver may resume driving after the stop process has been initiated or, alternatively aft the vehicle has come to a stop. The degeneration process that is to be executed in this conjunction is described in detail in the following with reference to the flowchart of FIG. 3.

Figure 3:
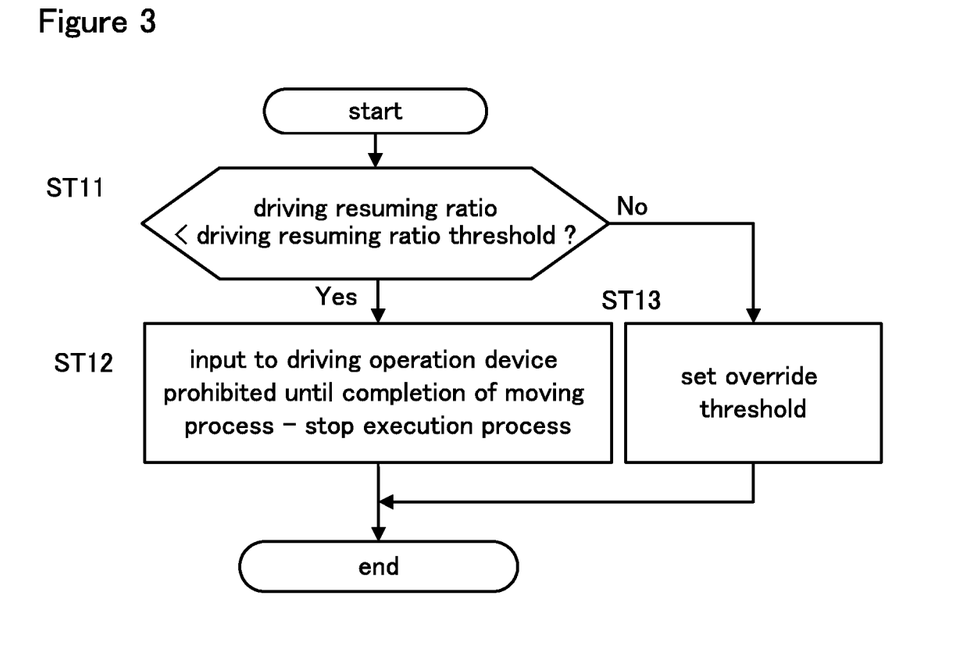
FIG. 3 is a flowchart of a degeneration threshold process.

In the degeneration process, the action plan unit 42 executes a threshold degeneration process for setting a threshold value for the operation amount of the driving operation device 10 to interrupt the stop process. As shown in FIG. 3, in the first step ST11 of the threshold degeneration process, the action plan unit 42 computes a driving resuming ratio indicating the possibility of the driver restarting the driving after the stop process is initiated based on the monitoring result of the occupant monitoring device 11. In the present embodiment, the driving resuming ratio is represented by a numerical value of 0 to 100, and indicates the likelihood of the driver resuming the driving after the stop process is started. The higher the numerical value is, the higher the likelihood of the occurrence of the resumption of the driving is. The driving resuming ratio is high, for example, when the driver is under no physical impairment, and became only temporarily unable to drive the vehicle for any reason when the stop process is initiated. The driving is unlikely to be resumed by the driver, for instance, when the driver has suffered a cardiac arrest. The action plan unit 42 may extract a face region from the driver's image acquired by the internal camera 26, and determine if the eyes are closed for a predetermined period of time or more. When the eyes are kept closed for a predetermined time or more, the action plan unit 42 may set the driving resuming ratio to a low value (for example, 10 or the like). As described above, the occupant monitoring device 11 functions as a monitoring device that acquires information on the driver's state, and monitors the possibility that the driver will resume driving after starting the stop process.

When a heart rate sensor is provided in the driver's seat, or when a heart rate sensor is provided in a wearable device worn by the driver, the action plan unit 42 may compute the driving resuming ratio based on a signal from the heart rate sensor. The driving resuming ratio gets lower as the driver's heart rate decreases. For example, the action plan unit 42 computes the driving resuming ratio to be 10 when the driver's heart rate acquired by the heart rate sensor is, for example, 30 times per minute (bpm).

The action plan unit 42 evaluates the possibility of the driver resuming the driving after the vehicle stop process is started depending on if the driving resume ratio is greater than the predetermined driving resume ratio threshold. As shown in FIG. 2, this determination is made before the moving process for moving the vehicle and the stop execution process for stopping the vehicle. The driving resuming ratio threshold is set as a threshold of the driving resuming ratio when the driver can resume driving or the driver is unable to resume driving after the stop process is initiated. For example, the driving resuming ratio threshold may be set to 10, which corresponds to the driving resuming ratio when the driver's heart rate is 30 bpm. As shown in FIG. 3, the action plan unit 42 executes step ST12 when the driving resuming ratio is less than the driving resuming ratio threshold, and executes step ST13 when the driving resuming ratio is equal to or greater than the driving resuming ratio threshold. As described above, by comparing the driving resuming ratio and the driving resuming ratio threshold, the action plan unit 42 can readily determine the possibility of the driver restarting the driving after the stop process is initiated. This simplifies the process of determining the stop area depending on the driver's situation.

In step ST12, the action plan unit 42 is set so as to prohibit reception of an input to the driving operation device 10 from the time point where the moving process (ST4 in FIG. 2) is initiated until the time when the stop execution process (ST7 in FIG. 2) is completed. When the setting is completed, the action plan unit 42 ends the threshold degeneration process.

The action plan unit 42 sets an override threshold in step ST13. The override threshold is a numerical value defined as a threshold for the operation amount of at least one of the elements of the driving operation device 10, and when the operation amount of the driving operation device 10 performed by the driver has exceeded the override threshold, the stop process is terminated. Thus, the override threshold is a threshold value (operation threshold value) for an operation amount of the driving operation device 10 that determines the stop process to be terminated or not. The override threshold may be a threshold for the rotational angle of the steering wheel. When the stop process is terminated, the driving authority is entirely transferred to the driver, and the driving is switched to the manual driving. When the setting of the override threshold is completed, the action plan unit 42 ends the threshold degeneration process.

Next, the stop area determination process is described in the following with reference to the flowchart of FIG. 4.

Figure 4:
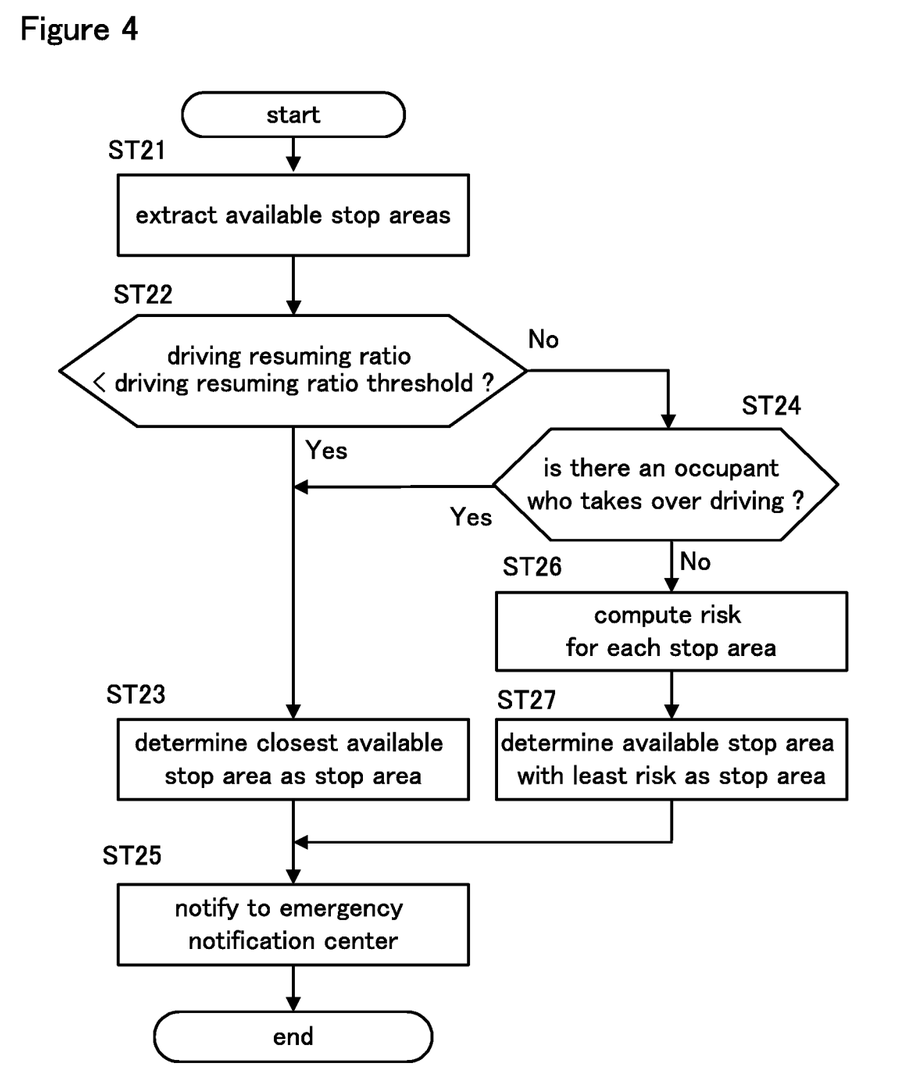
FIG. 4 is a flowchart of a stop area determination process.

As shown in FIG. 4, in the first step ST21 of the stop area determination process, the action plan unit 42 acquires areas where the vehicle can be stopped or parked (available stop areas) by searching side edges of the road, in particular the left edge of the road, along the route (planned travel route) which the vehicle is scheduled to follow from the start position P according to the map information. The action plan unit 42 may acquire emergency parking zones E1 and E2 as the available stop areas when the vehicle S is traveling on the highway as shown in FIG. 5. Upon completion of the acquisition of the available stop areas, the action plan unit 42 executes step ST22.

In step ST22, the action plan unit 42 obtains the driving resuming ratio in the same manner as in step ST11 of the threshold degeneration process, and determines if the obtained driving resuming ratio is less than the driving resuming ratio threshold. As shown in FIG. 2, this determination is made before the moving process for moving the vehicle and the stop execution process for stopping the vehicle. As shown in FIG. 4, when the driving resuming ratio is less than the driving resuming ratio threshold, step ST23 is executed. Otherwise, step ST24 is executed.

In step ST23, the action plan unit 42 determines an available stop area closer to the current location of the vehicle along the travel route than at least one other available stop area. In the present embodiment, the action plan unit 42 extracts an available stop area closest to the current location of the vehicle from the available stop areas, and determines the extracted available stop area as the selected stop area. When the determination is completed, the action plan unit 42 executes step ST25.

In step ST24, the action plan unit 42 acquires the monitoring result of the occupant monitoring device 11, and acquires the number of occupants based on the acquired monitoring result. More specifically, the action plan unit 42 acquires an image captured by the internal camera 26, and performs a per se known image analysis using deep learning or any other technique on the acquired image to detect an occupant. Thereby, the action plan unit 42 counts the number of adults excluding the driver from the detected occupants.

After that, the action plan unit 42 obtains the number of occupants who can drive on behalf of the driver, or in other words, the number of occupants who can take over the driving (hereinafter referred to as driving takeover personnel) from the driver. In the present embodiment, the action plan unit 42 is configured to store the face images of the occupants who can perform the driving operation in the storage unit 39 every time the driving operation is performed as the history of the drivers. Thus, the action plan unit 42 is able to identify those in the occupants who are able to take over the duty of driving the vehicle by referring to the history stored in the storage unit 39. The action plan unit 42 may also be configured to verify that the person seated in the driver's seat is able to drive the vehicle before allowing the vehicle to be started, and store the face image of the occupant seated in the driver's seat and verified to be able to drive the vehicle in the storage unit 39. When the number of occupants capable of driving the vehicle is one or more, the action plan unit 42 executes step ST23, and otherwise executes step ST26.

In step ST26, the action plan unit 42 first determines the route of the vehicle S from the current position to each available stop area by referring to the map information. Thereafter, the action plan unit 42 computes a risk that may be involved during the time the vehicle S travels from the current position to the corresponding available stop area along the route for each of the determined routes.

The action plan unit 42 may determine the risk based on the shape of the road leading up to the available stop area or the difficulty of traveling on the route from the current location of the vehicle to the available stop area. The action plan unit 42 may determine the risk based on the position and the terrain (for example, adjacent to a cliff) of the available stop area. The action plan unit 42 may compute the risk by computing the visibility of the own vehicle from surrounding vehicles during the course of traveling to the available stop area and/or after the own vehicle has come to a stop in the available stop area according to the map information. More specifically, the action plan unit 42 may compute the risk to be higher when the available stop area is connected to a curved part of the road than when the available stop area is connected to a straight part of the road because the visibility from surrounding vehicles is low in the former case. Further, the action plan unit 42 may obtain information on weather based on the image obtained from the external camera 19, and when it is determined that it is raining, the risk may be computed to be higher than when it is not raining.

When the computation of the risk is completed for each of the available stop areas, the action plan unit 42 executes step ST27.

In step ST27, the action plan unit 42 extracts an available stop area having a smaller risk than at least one other available stop area from all of the available stop areas, and determines the extracted available stop area as the selected stop area. In the present embodiment, the action plan unit 42 extracts an available stop area having the smallest risk from all of the available stop areas, and determines the extracted available stop area as the finally selected stop area. When the determination of the stop area is completed, the action plan unit 42 executes step ST25.

In step ST25, the action plan unit 42 notifies the emergency notification center of the determined stop area. When the notification is completed, the stop area determination process ends.

Next, the mode of operation of the vehicle control system 1 of the present embodiment is described in the following with reference to examples illustrated in FIGS. 5A, 5B and 5C. In these examples, it is assumed that the vehicle S is traveling on an urban highway having two lanes on each side. Of the two traveling lanes on one side, the lane on the left side in the traveling direction is described as a first lane L1, and the lane on the right side in the traveling direction is described as a second lane L2 (which will be the passing lane in this case, or in left-hand traffic). Further, it is assumed that the vehicle S becomes unable to properly travel the road while traveling in the first lane L1 due to a fault in the control unit 15 or the driver, and the stop process is initiated. Hereinafter, the position at which the stop process is initiated is referred to as a start position P. Further, it is assumed that two emergency parking zones for stopping a malfunctioning vehicle, an emergency vehicle, and the like are provided ahead of the vehicle on the left side of the vehicle S when the stop process is started. The first emergency parking zone E1 is nearer to the vehicle S than the second emergency parking zone E2. It is assumed that moving the vehicle S from the start position P and stopping the vehicle S at the first emergency parking zone E1 involves a higher risk than moving the vehicle S from the start position P and stopping the vehicle S at the second emergency parking zone E2. The time period required for executing the three processes, the notification process, the degeneration process, and the stop area determination process in the stop process is assumed to be sufficiently short so that the movement of the vehicle during the execution of these processes is negligibly small. Further, it is assumed that after determining the stop area, the vehicle S always stops at a stop position in the stop area.

Figure 5A:
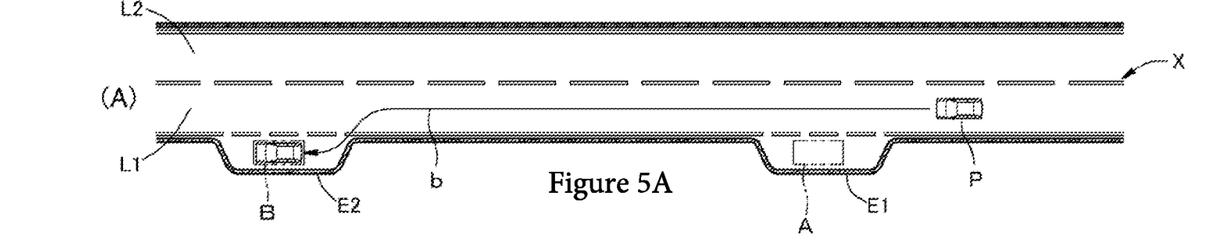
FIG. 5A is a diagram illustrating the movement of a vehicle in the stop process in a first situation.

In FIG. 5A is shown the movement of the vehicle when only one driver is on the vehicle S and the driving resuming ratio is equal to or higher than the driving resuming ratio threshold (hereinafter, the first example), and the stop process is executed. When the stop process is executed, the action plan unit 42 determines in the degeneration process that the driving resuming ratio of the driver is equal to or higher than the driving resuming ratio threshold (ST11), and sets an override threshold (ST13).

Thereafter, in the stop area determination process, the action plan unit 42 searches the front of the vehicle S along the left edge of the road on which the vehicle S is travelling, using the map information held by the navigation device 9, and extracts available stop areas. The action plan unit 42 then sets an available stop area in each of the first emergency parking zone E1 and the second emergency parking zone E2 (ST21). Hereinafter, the available stop area set in the first emergency parking zone E1 is described as an available stop area A, and the available stop area set in the second emergency parking zone E2 is described as an available stop area B.

The action plan unit 42 then determines that the driving resuming ratio is less than the driving resuming ratio threshold (ST22). Further, the action plan unit 42 analyzes the image captured by the internal camera 26 and compares the image with the drivers' history stored in the storage unit 39 to determine that there is no occupant capable of taking over the driving (ST24). Thereafter, the action plan unit 42 acquires routes from the current position of the vehicle to the available stop areas. In this example, the action plan unit 42 acquires a route a from the start position P to the available stop area A in the first emergency parking zone E1 and another route b from the start position P to the available stop area B in the second emergency parking zone E2. The action plan unit 42 then computes the risk for the vehicle S to travel along the route a and stops at the available stop area A, and the risk for the vehicle S to travel along the route b and stops at the available stop area B, and compare the two risks. In this example, traveling from the start position P to the first emergency parking zone E1 involves a higher risk for the vehicle S than traveling from the start position P to the second emergency parking zone E2. Therefore, the action plan unit 42 determines that stopping in the available stop area B involves a smaller risk than stopping in the available stop area A, and determines the available stop area B as the stop area (ST27).

When the determination of the stop area is completed, the action plan unit 42 notifies the emergency notification center of the determined stop area via the communication device 8. When the notification of the stop area is completed, the action plan unit 42 ends the stop area determination process. The action plan unit 42 then stops the vehicle S at a stop position in the stop area B in the stop execution process.

Figure 5B:
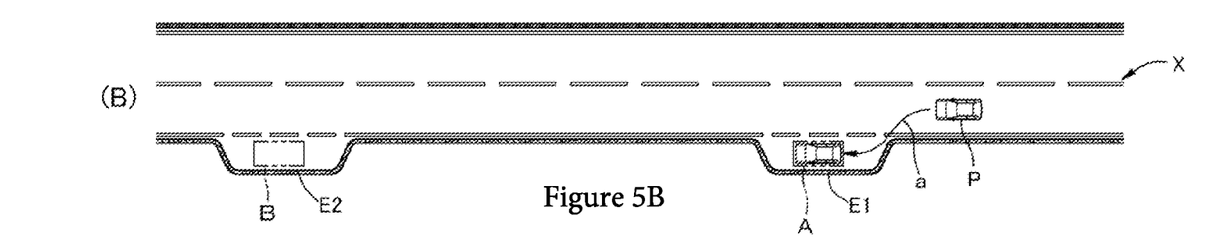
FIG. 5B is a diagram illustrating the movement of a vehicle in the stop process in a second situation.

In FIG. 5B is illustrated the movement of the vehicle when the stop process is executed with only one driver on the vehicle S, and the driving resuming ratio less than the driving resuming ratio threshold (hereinafter, the second example). When the stop process is executed, the action plan unit 42 determines that the driving resuming ratio is less than the driving resuming ratio threshold in the threshold degeneration process of the degeneration process (ST11), and performs all of the processes ranging from the moving process to the stop execution process until the completion of these processes. The control of the vehicle via the input operation to the driving operation device 10 is prohibited (ST12).

Thereafter, in the stop area determination process, the action plan unit 42 extracts available stop areas, and designates the available stop areas A and B in the first emergency parking zone E1 and the second emergency parking zone E2, respectively, similarly as in the first example (ST21). Thereafter, the available stop area A close to the current location of the vehicle S is selected from the available stop areas A and B, and the selected available stop area A is determined as the final stop area. When the determination of the stop area is completed, the selected stop area is notified to the emergency notification center similarly as in the first example (ST25), and the stop area determination process ends. Then, the action plan unit 42 stops the vehicle S at a stop position in the stop area selected by the stop execution process.

Figure 5C:
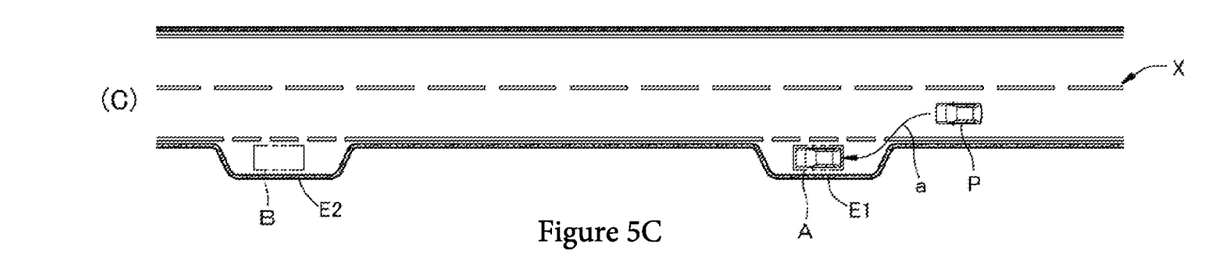
FIG. 5C is a diagram illustrating the movement of a vehicle in the stop process in a third situation.

FIG. 5C shows the movement of the vehicle S when the stop process is executed in a situation where one occupant who can take over the driving is on the vehicle S in addition to the driver, and the driving resuming ratio is less than the driving resuming ratio threshold (hereinafter, a third example). Once the stop process is initiated, the action plan unit 42 determines that the driving resuming ratio is less than the driving resumption rate threshold in the threshold degeneration process of the degeneration process (ST11), and sets an override threshold (ST12).

Thereafter, in the stop area determination process, the action plan unit 42 extracts available stop areas, and designates the available stop areas A and B in the first emergency parking zone E1 and the second emergency parking zone E2, respectively, similarly as in the first example (ST21). Next, the action plan unit 42 determines that the driving resuming ratio is less than the driving resuming ratio threshold (ST22). Further, the action plan unit 42 analyzes the image captured by the internal camera 26, and compares the image with the drivers' history stored in the storage unit 39 to determine that there is a potential driving substitute or, in other words, an occupant who can take over the driving (ST24). Thereafter, the available stop area A close to the current location of the vehicle S is selected from the available stop areas A and B, and the selected available stop area A is determined as the final stop area. When the determination of the stop area is completed, the stop area is notified to the emergency notification center similarly as in the first example (ST25), and the stop area determination process ends. Then, the action plan unit 42 stops the vehicle S at a stop position in the stop area selected by the stop execution process.

The advantages of the vehicle control system 1 of the present embodiment are discussed in the following with reference to FIGS. 5A, 5B and 5C. As shown in FIG. 5A, when the driving resuming ratio is equal to or higher than the driving resuming ratio threshold, and there is no occupant who can take over the driving on the vehicle S, the action plan unit 42 may stop the vehicle at the area B which involves only a small risk associated with the moving and stopping. Thus, when the driver is highly likely to restart driving, and an urgent rescue operation is not required, the vehicle S can be stopped in the available stop area B where the risk of movement and stop is small. Thus, the vehicle S can be stopped more safely when the driver does not require an immediate rescue operation.

As shown in FIG. 5B, when the driving resuming ratio is less than the driving resuming ratio threshold and there is no occupant on the vehicle S who can take over the driving, the action plan unit 42 determines the available stop area closest to the vehicle S as the stop area. Thus, when the driver is unlikely to resume driving and needs an immediate rescue operation, the vehicle S can be stopped at the nearest available stop area A. Thus, when the driver needs an immediate rescue operation, the vehicle S can be stopped most quickly.

As shown in FIG. 5C, when the driving resuming ratio is equal to or higher than the driving resuming ratio threshold, and there is at least one occupant on the vehicle S who is able to take over the driving, the action plan unit 42 determines the available stop area A closest to the vehicle S as the stop area. As a result, the vehicle S can be stopped most quickly, and the current driver can be changed to the new driver most quickly. In this way, by allowing the driver to be changed to the new driver quickly, the new driver can drive the vehicle S to quickly transport the previous driver to a place like a hospital where aid can be provided.

In the first example and the third example, in executing the degeneration process, it is determined that the driving resuming ratio is equal to or higher than the driving resuming ratio threshold, and the override threshold is set. Thereby, when it is highly probable that the driver will resume driving, the vehicle stop process can be terminated by the driver performing an input which is equal to or more in amount than the override threshold. This allows the driver to quickly resume driving. On the other hand, in the second example, it is determined that the driving resuming ratio is less than the driving resuming ratio threshold, and the control of the vehicle based on input operations to all parts of the driving operation device 10, ranging from the moving process to the completion of the stop execution process, is prohibited. Thus, when the driver is unlikely to resume driving, an input to the driving operation device 10 is not accepted, and the vehicle stop process is not interrupted by an input operation to the driving operation device 10. As a result, for example, even when the driver unintentionally inputs to the driving operation device 10 due to a seizure or the like, the input causes no change in the behavior of the vehicle so that the vehicle can be stopped more safely.

In all of the first to third examples, immediately after the stop area is determined, the stop area is notified to the emergency notification center (ST25), and the vehicle is then stopped. As described above, the emergency information center is notified of the position information of the stop area immediately after the determination of the stop area is made so that where the vehicle in an emergency situation is located can be detected promptly. As a result, the emergency vehicle can reach the position where the vehicle S has come to a stop very quickly so that the driver's rescue can be started earlier.

Second Embodiment

Figure 6:
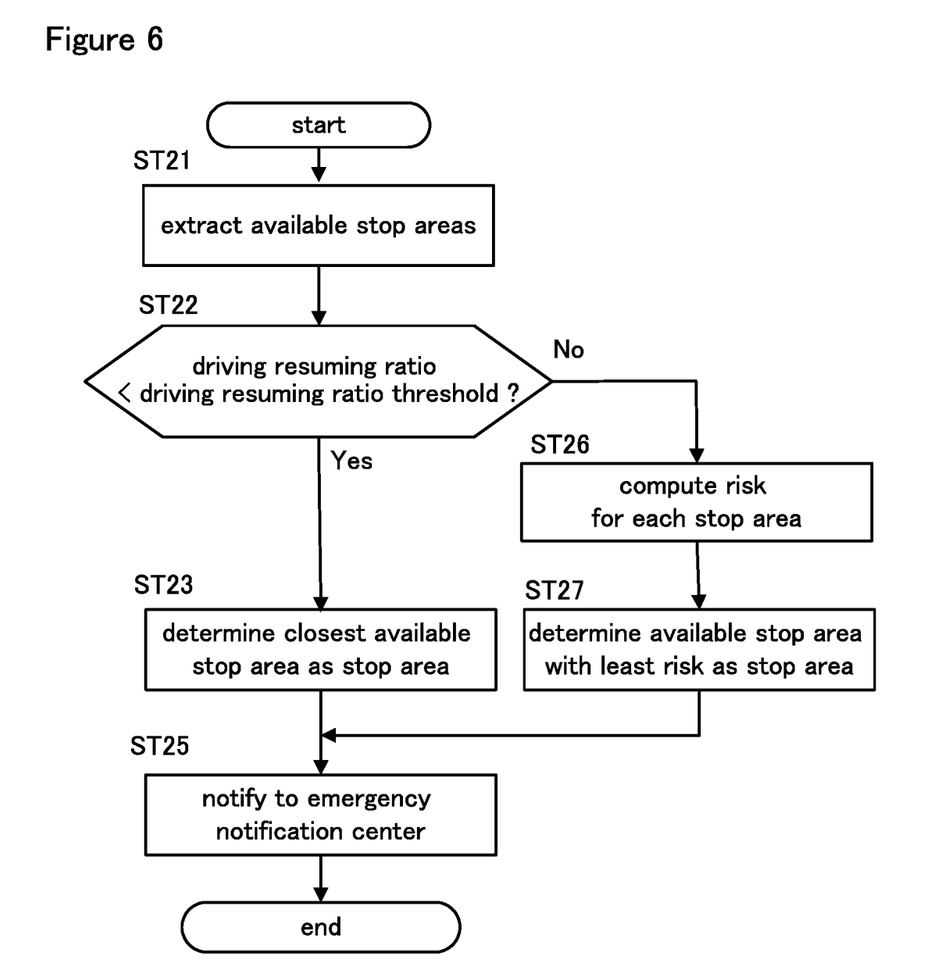
FIG. 6 is a flowchart of a stop area determination process according to a second embodiment of the present invention.

The vehicle control system 101 according to the second embodiment differs from the first embodiment in the stop area determination process as shown in FIG. 6. More specifically, the stop area determination process of the vehicle control system 101 according to the second embodiment is different from that of the first embodiment in that there is no step (ST24) for determining if there is an occupant who can take over the driving. Otherwise, the remaining part of the second embodiment is no different from that of the first embodiment. Therefore, the discussion of such part will be omitted from the following description to avoid redundancy, and the following description will be limited to the stop area determination process of the second embodiment which is not found in the first embodiment.

After extracting the available stop areas (ST21), the action plan unit 42 determines whether the driving resuming ratio is less than the driving resuming ratio threshold (ST22). When the driving resuming ratio is less than the driving resuming ratio threshold, an available stop area closer to the current position of the vehicle along the traveling route than at least one other available stop area is determined as the stop area, similarly as in the first embodiment. In the present embodiment, the action plan unit 42 determines the available stop area closest to the vehicle of all the available stop areas as the stop area (ST23). When the driving resuming ratio is equal to or greater than the driving resuming ratio threshold, the risk of traveling to each of the available stop areas and stopping is calculated (ST26). Then, an available stop area involving the lowest risk of all the available stop areas is extracted, and the extracted available stop area is determined as the stop area. In the present embodiment, the action plan unit 42 determines an available stop area involving the lowest risk of all the available stop areas as the stop area (ST27). When the determination of the stop area is completed, the stop area is notified to the emergency notification center similarly as in the first embodiment, and the stop area determination process ends.

According to this embodiment, when the driving resuming ratio is less than the driving resuming ratio threshold, the available stop area closest to the vehicle is determined as the stop area. Therefore, when the problem with the driver is serious enough for the driver to be unable to resume driving, the vehicle can be stopped highly promptly, and the rescue operation for the driver can be started earlier. When the driving resuming ratio is equal to or greater than the driving resuming ratio threshold, an available stop area involving the smallest risk is determined as the stop area. Thus, when there is some possibility that the driver may resume driving, the vehicle can be stopped at a position involving a low risk during the course of the vehicle coming to a stop, and the vehicle can be stopped most safely.

In the second embodiment, as opposed to the first embodiment, even when an occupant who can take over the driving is on board, the vehicle is stopped at a position involving a low risk during the course of the vehicle coming to a stop so that the vehicle can be most safely stopped. Further, similarly as in the first embodiment, after the vehicle comes to a stop, if there is an occupant who is capable of driving on board, this new driver can take over the driving operation on behalf of the driver, and drive the vehicle so as to transport the driver to where an aid is available such as a hospital.

The present invention has been described in terms of specific embodiments, but is not limited by such embodiments, but can be modified in various ways without departing from the scope of the present invention. In the above embodiment, the action plan unit 42 extracted the available stop areas by using the map information retained by the navigation device 9, but the present invention is not limited to this configuration. The vehicle control system 1 only needs to have at least one of the external environment recognition device 6 for acquiring information on the environment surrounding the vehicle and the navigation device 9 (map device) that retains map information. The vehicle S may be configured to search ahead of the vehicle S on the road on which the vehicle S is traveling to extract available stop areas, for instance, according to the signal obtained from the external environment recognition device 6.

In the above embodiment, the action plan unit 42 computed the driving resuming ratio, and determined the stop area by comparing the driving resuming ratio with the driving resuming ratio threshold. However, the present invention is not limited to this arrangement. The action plan unit 42 may determine the possibility of the driver resuming the driving according to the monitoring result of the occupant monitoring device 11, and determine the stop area depending on the possibility of resuming the driving. As the driving resuming ratio increases, the area for extracting the available stop areas may be expanded. In this conjunction, the action plan unit 42 may determine the stop area by selecting an available stop area most suitable for resuming the driving from the extracted available stop areas. By configuring the action plan unit 42 in this manner, the area for extracting the available stop areas can be expanded as the driving resuming ratio increases. As a result, the probability of extracting available stop areas which are comparatively more suitable for resuming the driving can be increased so that the particular situation of the driver can be taken into account in the selection of the stop area.

In the above embodiments, when the driving resuming ratio is equal to or higher than the driving resuming ratio threshold, the action plan unit 42 determined the stop area from the available stop areas according to the risk involved in coming to a stop in each available stop area, but the present invention is not limited to such an arrangement. For example, the action plan unit 42 may evaluate the accessibility of the emergency vehicle to each of the available stop areas, and determine the available stop area which offers the best accessibility to the emergency vehicle as the stop area. Further, when selecting the stop area from the available stop areas, the available stop area providing the highest level of comfort in terms of, for instance, noises or vibrations in the cabin may be selected as the stop area. The action plan unit 42 may select the stop area which is increasingly farther away from the current position of the vehicle as the driving resuming ratio increases.

Further, the action plan unit 42 may compute the driving resuming ratio based on the degree of abnormality detected by various devices (for example, the external environment recognition device 6 and the vehicle sensor 7) that could affect autonomous driving, in addition to the information from the occupant monitoring device 11. Further, the action plan unit 42 may determine if the vehicle state determination unit 51 has determined that the vehicle state is abnormal before executing step ST11 of the available stop area determination process, and if the vehicle state is determined to be abnormal, the available stop area closest to the vehicle S may be selected as the stop area (ST25), and then the emergency notification center may be notified (ST26).

In the above-described embodiments, the action plan unit 42 was configured to determine the stop area, and determine the stop position at which the vehicle stops in the stop area. However, after the action plan unit 42 has determined the stop area, the vehicle may be parked in the stop area without determining the stop position.

In the above-described embodiments, the action plan unit 42 determined the available stop area closest to the vehicle as the stop area when the driving resuming ratio is less than the driving resuming ratio threshold in the stop process (ST23), but the present invention is not limited to this arrangement. In the stop process, the action plan unit 42 may determine the stop area according to the distance to the available stop area when the driving resuming ratio is less than the driving resuming ratio threshold. More specifically, when the driving resuming ratio is less than the driving resuming ratio threshold, the action plan unit 42 may extract an available stop area from the available stop areas which is closer to the vehicle than at least one other available stop area, and determined the extracted available stop area as the stop area. For example, when there are three or more available stop areas, the action plan unit 42 may extract the available stop area closest to the vehicle, and the available stop area next closest to the vehicle, and select one of these two available stop areas which involves a lower risk as the stop area.

In the above-described embodiments, when the driving resuming ratio is equal to or greater than the driving resuming ratio threshold in the stop process, the action plan unit 42 extracted the available stop area having the smallest risk, and determined the extracted available stop area as the stop area (ST27), but the present invention is not limited to this arrangement. In the stop process, when the driving resuming ratio is equal to or greater than the driving resuming ratio threshold, the action plan unit 42 may determine the stop area from the available stop areas by evaluating the risk associated with each available stop area. More specifically, the action plan unit 42 may extract an available stop area having a lower risk than at least one other available stop area from the available stop areas, and determine the extracted available stop area as the stop area. For example, when there are three or more available stop areas, the action plan unit 42 may extract the available stop area involving the lowest risk, and the available stop area involving the next lowest risk, and select one of these two available stop areas which is closer to the vehicle as the stop area.

In the above embodiments, it was assumed that the vehicle is traveling in a country or a region of left-hand traffic, but the present invention is not limited to this. When the vehicle is traveling in a country or a region of right-hand traffic, the vehicle control system 1 may control the vehicle in such a manner that the left and right are interchanged in the above description.

The invention claimed is:

1. A vehicle control system (1, 101), comprising:
a control unit (15) for steering, accelerating, and decelerating a vehicle;
an occupant monitoring device (11) configured to monitor a driver of the vehicle; and at least one of an external environment recognition device (6) configured to acquire information on an environment surrounding the vehicle, and a map device (9) retaining map information;

wherein the control unit is configured to execute a stop process by which the vehicle is parked in a prescribed stop area when it is detected that the control unit or the driver has become incapable of properly maintaining a traveling state of the vehicle, wherein, in the stop process, the control unit extracts a plurality of available stop areas according to information from at least one of the external environment recognition device and the map device, and selects a stop area from the available stop areas (A, B) by taking into account a possibility of the driver resuming driving the vehicle after the stop process has been initiated according to a result of monitoring the driver by the occupant monitoring device, and wherein the control unit is configured to compute a driving resuming ratio indicating a possibility of the driver resuming driving the vehicle after the stop process has been initiated according to the result of monitoring the driver by the occupant monitoring device, and to determine the stop area by comparing the driving resuming ratio with a prescribed driving resuming ratio threshold.

2. The vehicle control system according to claim 1, wherein, in the stop process, the control unit is configured to determine the stop area from the available stop areas which is closer to a current position of the vehicle than at least one other available stop area when the driving resuming ratio is smaller than the driving resuming ratio threshold.

3. The vehicle control system according to claim 2, wherein the map device retains a planned travel route of the vehicle, and in the stop process, when the driving resuming ratio is equal to or greater than the driving resuming ratio threshold, the control unit determines the available stop area involving a lower risk than at least one other available stop area as the stop area by computing a risk involved in traveling to each available stop area and coming to a stop at the stop area according to at least one of the information acquired by the external environment recognition device and the map information retained by the map device.

4. The vehicle control system according to claim 2, wherein the map device retains a planned travel route of the vehicle, and the occupant monitoring device is configured to monitor an occupant other than the driver; and wherein, in the stop process, when the driving resuming ratio is equal to or greater than the driving resuming ratio threshold, the control unit determines if it is detected that an occupant capable of taking over driving is onboard according to a signal from the occupant monitoring device, the control unit determining the available stop area closer to the vehicle than at least one other available stop area as the stop area when it is detected that an occupant capable of taking over driving is onboard, and determining the available stop area involving a lower risk than at least one other available stop area as the stop area when it is detected that an occupant capable of taking over driving is not onboard by computing a risk involved in traveling to each available stop area and coming to a stop at the stop area according to at least one of the information acquired by the external environment recognition device and the map information retained by the map device.

5. The vehicle control system according to claim 2, further comprising a driving operation device that receives an input operation performed by the driver to control the vehicle, wherein, in the stop process, the control unit prohibits the input operation to the driving operation device to control the vehicle until the vehicle comes to stop when the driving resuming ratio is smaller than the driving resuming ratio threshold, and prohibits the input operation to the driving operation device to control the vehicle until an amount of the input operation to the driving operation device to control the vehicle has become equal to or greater than a prescribed operation amount threshold.

6. The vehicle control system according to claim 1, wherein, in the stop process, once the stop area is determined, the control unit notifies position information of the stop area to an external station or an external device before the vehicle reaches the stop area.

* * * * *